Figure 1:
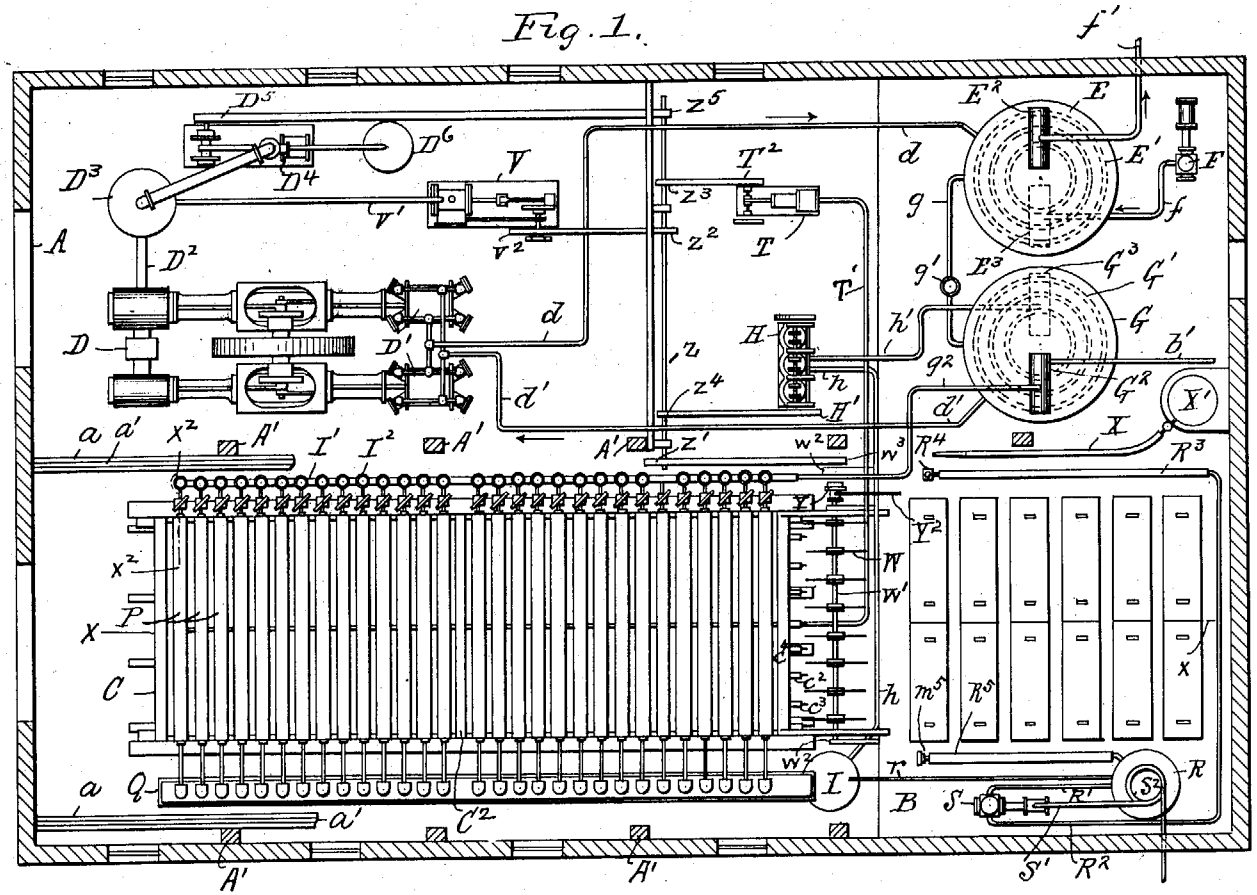

No. 12,808. REISSUED JUNE 9, 1908.

D. J. HAVENSTRITE.

ICE MAKING APPARATUS.

APPLICATION FILED DEC. 14, 1907.

4 SHEETS—SHEET 1.

Witnesses:
Gertrude T. Porter
Robert H. Kirk.

Inventor
David J. Havenstrite
By his Attorney
Louis Bergquist

No. 12,808. REISSUED JUNE 9, 1908.

D. J. HAVENSTRITE.

ICE MAKING APPARATUS.

APPLICATION FILED DEC. 14, 1907.

4 SHEETS—SHEET 2.

Witnesses:
Gertrude T. Porter
Robert H. Kirk

Inventor
David J. Havenstrite
By his Attorney
Paul Benjamin

No. 12,808. REISSUED JUNE 9, 1908.
D. J. HAVENSTRITE.
ICE MAKING APPARATUS.
APPLICATION FILED DEC. 14, 1907.
4 SHEETS—SHEET 3.
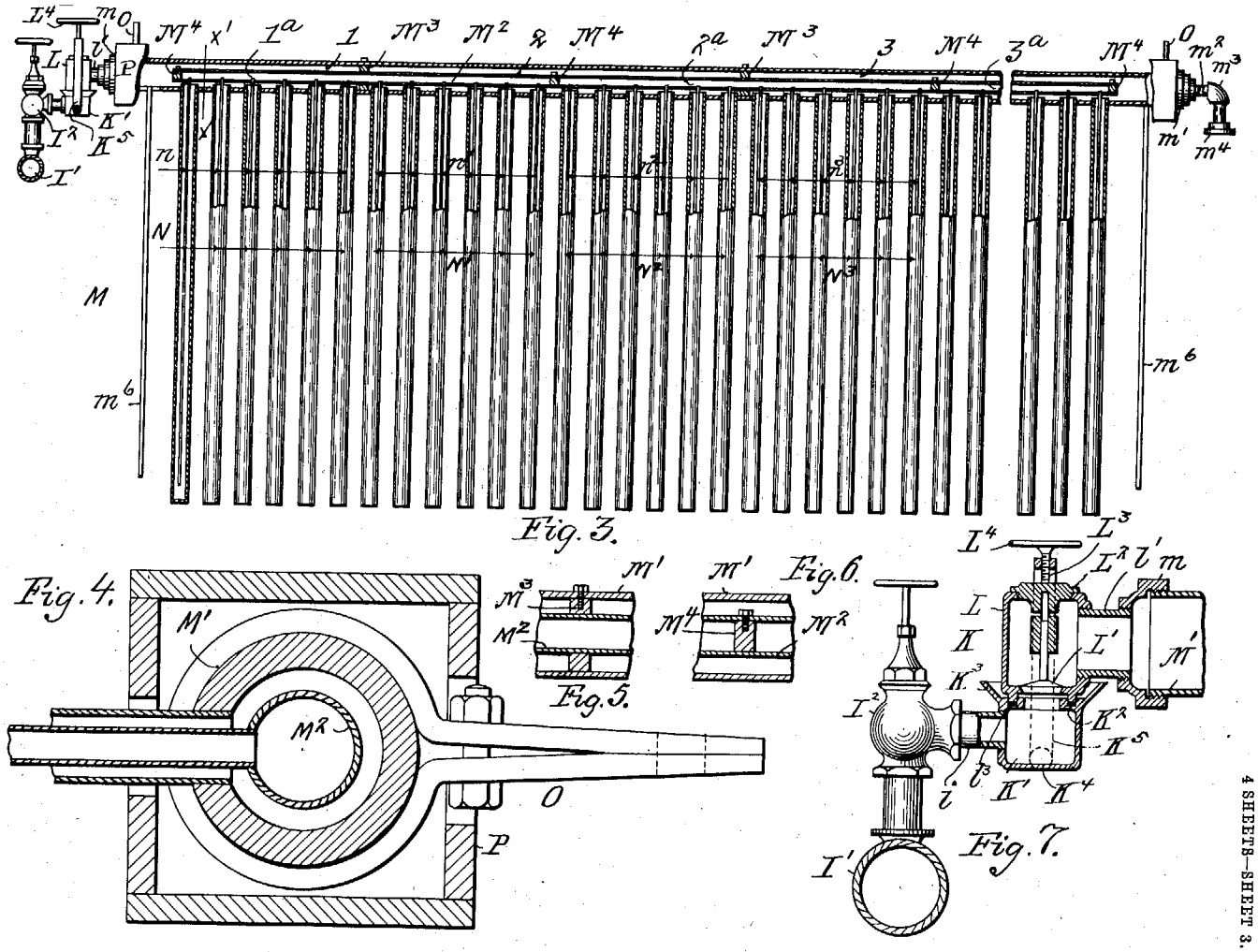
Witnesses:
Gertrude T. Porter.
Robert H. Kirk.
Inventor
David J. Havenstrite
By his Attorney
Paul Bergan No. 12,808. REISSUED JUNE 9, 1908.

D. J. HAVENSTRITE.

ICE MAKING APPARATUS.

APPLICATION FILED DEC. 14, 1907.

4 SHEETS—SHEET 4.

Witnesses:
Gertrude T. Porter.
Robert H. Kirk.

Inventor
David J. Havenstrite
By his Attorney
Fair Benjamin

UNITED STATES PATENT OFFICE.

DAVID J. HAVENSTRITE, OF NEWARK, NEW JERSEY, ASSIGNOR, BY MESNE ASSIGNMENTS, TO CENTERFREZE ICE PROCESS COMPANY, A CORPORATION OF ARIZONA TERRITORY.

ICE-MAKING APPARATUS.

No. 12,808. Specification of Reissued Letters Patent. Reissued June 9, 1908.

Original No. 842,147, dated January 22, 1907, Serial No. 262,210. Application for reissue filed December 14, 1907. Serial No. 406,574.

*To all whom it may concern:*

Be it known that I, DAVID J. HAVENSTRITE, a citizen of the United States, and a resident of Newark, in the county of Essex and State of New Jersey, have invented certain new and useful Improvements in Ice-Making Apparatus, of which the following is a specification.

This invention relates to improved means for making plate-ice. Among its specific points of novelty is the production of plate-ice without the casing or cells that are generally used with the plate ice-plants.

With the freezing-plates heretofore used the refrigerant has to produce its effect through the whole cake of ice from one side thereof to the other, requiring the conduction of the cold-producing agent through the total thickness. With my invention the ice is formed radially in all directions, reducing the thickness through which the cold-producing agent has to act or be conducted, saving thereby energy and time. The ice cake is formed between a plurality of parallel separate tubes supported removably in the tank containing the water to be frozen, said cake then being adherent upon the immersed peripheries and ends of said tubes. It is further formed with its bounding surfaces entirely free from the inner surfaces, sides, ends and bottom of the tank. After the cake is thus produced free from the tank, it is lifted by and with the tubes to which it adheres, from the tank, and by circulating a suitable thawing medium through said tubes it is separated therefrom. When it is desired to transport the ice cake to a distance from the tank, as for example, to a refrigerated storage chamber, the tubes are left in the cake and serve to reinforce it, and so prevent accidental breakage during transit. The tubes may also be left in the cake during the division of the same into smaller pieces by cutting devices, such as circular saws, operating in planes lying between the tubes. The whole ice cake, or the divided ice cake, containing the tubes may be transported to the refrigerated chamber and the thawing off there accomplished.

Another feature of my invention resides in the auxiliary rods supported in proximity to the tubes, which after the cake is divided by the saws in the manner described retain the end portions in connection with the tube support, so that said portions may be returned to the tank for the purpose hereinafter explained.

The invention is exemplified in the accompanying drawings, in which—

Figure 2:
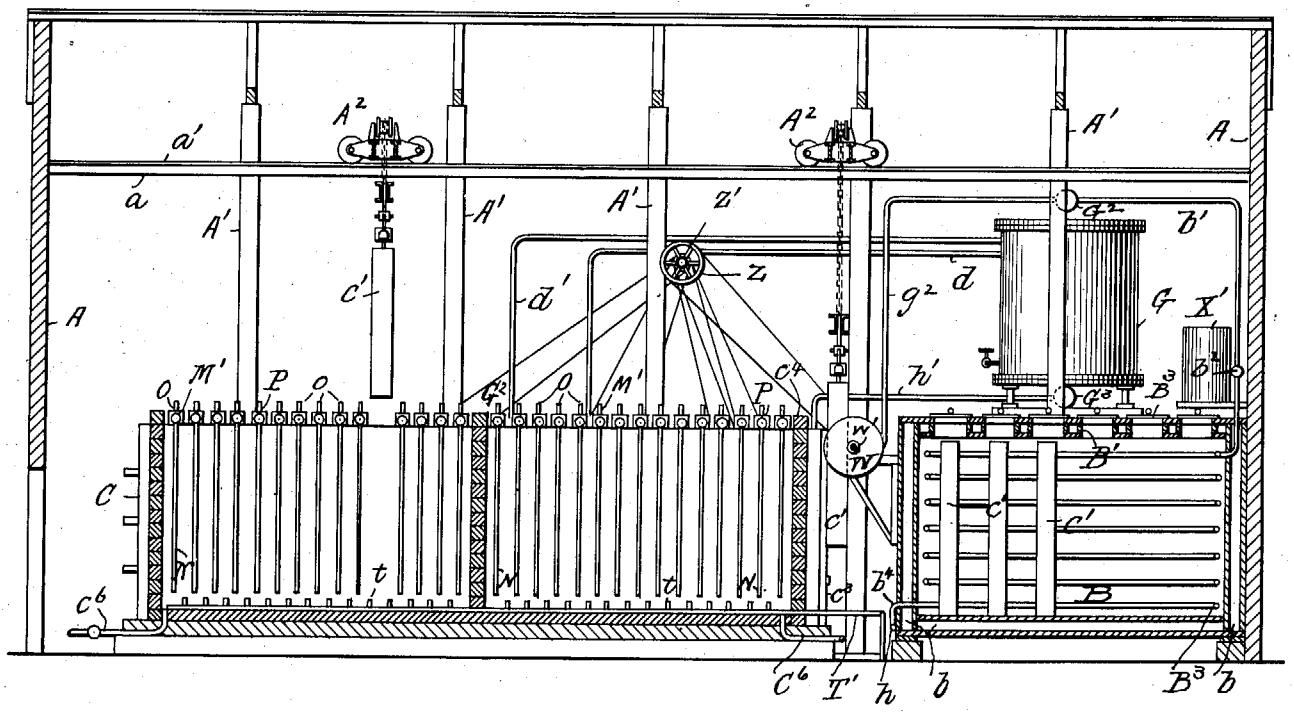
Figure 8:
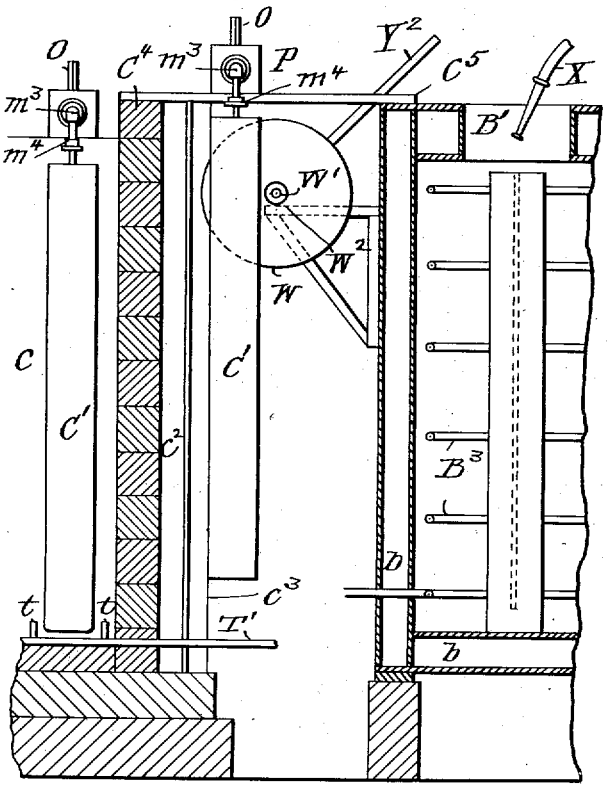
Figure 9:
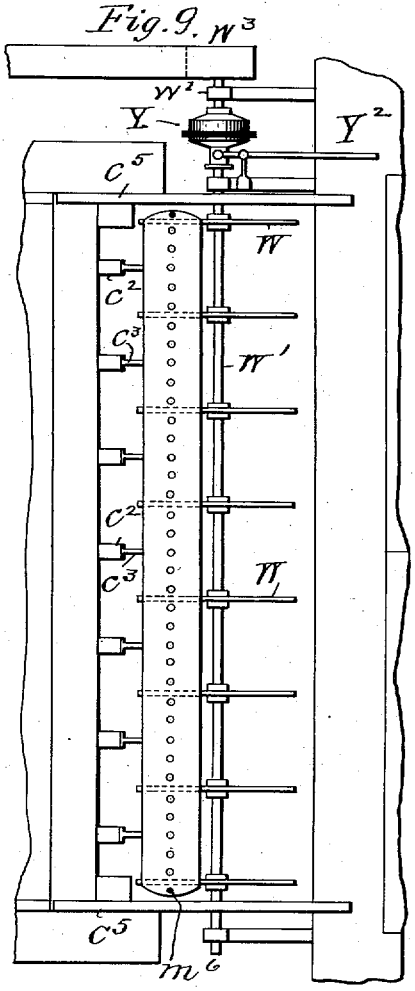
Figure 10:
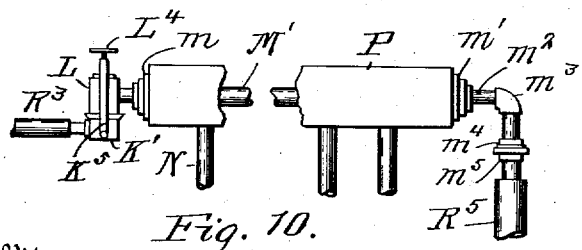

Figure 1 shows a sectional plan view of a building with a plate-ice plant. Fig. 2 represents a section of Fig. 1 on the line $x$ $x$. Fig. 3 is a partial axial section and elevation of one section of the freezing-plates with their appurtenances. Fig. 4 represents a section of Fig. 3 as on the line $x'$ $x'$. Figs. 5 and 6 show enlarged fragmentary portions of Fig. 3. Fig. 7 shows an enlarged partial section through one of the freezing-plates as on the line $x^2$ $x^2$ of Fig. 1. Fig. 8 represents an enlarged fragmentary portion of Fig. 2. Fig. 9 is a top view of Fig. 8. Fig. 10 represents a fragmentary side view of one of the freezing-plates with hose connections attached thereto.

A building is shown at A with posts A′, to which are secured runway-beams $a$ for the track rails $a'$ of cranes $A^2$. Cakes of ice C′ are shown supported from the said cranes.

A freezing tank C, with a bulkhead $C^2$ dividing it into sections, is situated under the said cranes, so that freezing-plates, with the lifting clamps O, can be handled by the cranes. An ice-house B is also under the runways of the crane. Its walls are insulated, as shown at $b$, and have openings B′, with covers $B^2$ and cooling coils $B^3$. A number of cakes of ice C′ are shown therein.

A compressor-engine D with a compound steam end discharges the compressed freezing medium, like ammonia, through the discharge-piping $d$ into the shell of the condenser E, the latter containing the cooling coil E′, which is connected at the top of the header $E^2$ and on the bottom to the header $E^3$. A water-circulating pump F forces water through the piping $f$ into the header $E^3$, and the piping $f'$ connected to the header $E^2$, drains the latter and the coil E′.

A brine-cooling tank G is connected with the condenser E by means of the piping $g$ having the expansion valve $g'$. Piping $d'$ extends from the brine cooling tank G to the compressor end D′ of the compressor-engine D. On the inside of the said tank G is located the brine-cooling coil G′, with the top header $G^2$ and bottom header $G^3$. A brine-circulating pump H has its suction-piping $h$ extending from a brine storage tank I, and its discharge-piping $h'$ is connected with the bottom header $G^3$ of the said tank G. The top header $G^2$ has leading therefrom the piping $b'$, with valve $b^2$, that connects with the cooling-coils $B^3$ and the latter are connected by means of the piping $b^4$ to the storage tank I, and so to the suction piping $h$ of the pump H. The top header $G^2$ is connected to the piping $g^2$, which leads to the main brine-header I′, that has connected therewith the valves $I^2$. The latter have the nipples $i$, that join with the couplings, (designated by the letter K.) The said couplings each comprise the cup-chamber K′, with the seat $K^2$, cupped flange $K^3$, and pins $K^4$, for the U-shaped strap $K^5$. Arranged to seat with the said cup-chamber is the valve-chamber L, having the projecting collar 13, with the valve L′ and cap $L^2$ drilled for the spindle $l$ of the valve L′. A threaded spindle $L^3$, with handle $L^4$, operates through a threaded opening in the said strap $K^5$, by virtue of which the valve-chamber L can be easily clamped to and disconnected from the cup-chamber K′. From the said valve-chamber L there extends the nipple $l'$, which connects with the coupling $m$ of the pipe M′ of the freezing-plates, (designated by the letter M). The said plates each comprise the outer horizontal pipe M′, with the rods $m^6$ secured near their ends. In the pipe M′ is located the inner horizontal pipe $M^2$. Collars $M^3$ hold the latter pipe in proper position and also divide the large pipe M′ in sections, as 1, 2, 3, &c. The inner pipe $M^2$ has attached thereto the plugs $M^4$, dividing the latter pipe into sections $1^a$, $2^a$, $3^a$, &c. From the outer horizontal pipe M′, which with its associated parts forms a header or support, extend the vertical tubes N, N′, $N^2$, $N^3$, etc., that are closed on the bottom, and from the inner horizontal pipe $M^2$ extend the inner vertical tubes $n$, $n'$, $n^2$, $n^3$, etc., which latter are open at both ends. At the ends of each outer pipe M are secured lifting clamps O, having each an opening O′, and a casing P covers each of the said pipes M′ to hold an insulating material and prevent as much as possible the reduction of the temperature of the medium contained in the freezing-plates. At the other end of each of the pipes M′ there is connected a reducing coupling $m'$, from which latter extends a nipple $m^2$, with elbow $m^3$ and one member $m^4$ of a coupling. It is evident that the inlet and outlet of the freezing-plate could be arranged with the inner pipe $M^2$ instead of the outer pipe M′, or the inlet could be arranged with the outer pipe and the outlet with the inner pipe, or vice versa. A trough Q is located under the ends of the coupling members $m^4$ and leads to the brine-storage tank I.

A thawing apparatus is represented to consist of the brine-tank R, from which leads the piping R′ to the suction end of the pump S, and discharge-piping $R^2$ of said pump connects with the hose $R^3$, having a coupling member $R^4$ similar in construction to the cup-chamber K′ of the main brine-header. A hose $R^5$ with a coupling member $m^5$ extends from the tank R. The exhaust-piping S′ of the pump S connects with a coil $S^2$ in the tank R.

An air compressor T has its discharge pipe T′ extended into the freezing-tank C, and at the bottom thereof nipples $t$ extend from the pipe T into the said freezing tank. The steam end of the compressor-engine D has its exhaust-pipe $D^2$ connected with a heater $D^3$, from which latter the exhaust-steam is drawn to a condensing apparatus $D^4$. An engine V has its exhaust pipe V′ also connected with the heater $D^3$.

Between the freezing-tank C and ice house B there are mounted the saws W on the shaft W′, supported in bearings $W^2$. A friction clutch Y with the handle $Y^2$ is connected up with the shaft W′. A pulley $W^3$ on the shaft W′ is belted to the pulley Z′ on the main shaft Z. The latter shaft is driven by the engine V by means of belting connecting the pulley $V^2$ on the engine-shaft with the pulley $Z^2$ on the shaft Z. The air-compressor T is driven from the shaft Z by means of belting connecting the pulley $T^2$ of the compressor T with the pulley $Z^3$ on the main shaft Z. The brine-circulating pump H is driven by belting connecting the pulley $Z^4$ on the main shaft with the pulley H′ on the said pump. The condensing apparatus has the pulley $D^5$ connected by belting with the pulley $Z^5$ of the said main shaft Z. Extending from the bulkhead $C^4$ on the freezing-tank C are secured the wooden vertical rail supports $C^2$, faced with the iron rails $C^3$, and ice-guiding bars $C^5$ extend from the bulkhead $C^4$ to the ice house B.

To use the invention, the tank C, containing the freezing-plates M, is filled with water. The compressor engine D is started, exhausting the evaporated refrigerant, like ammonia, from the brine cooling tank G and discharging it into the condenser E, where it is condensed into a liquid by means of water circulating through the coil E′ with the water circulating pump F. The refrigerant is then led into the brine-cooling tank G by way of the piping $g$ and through the expansion-valve $g'$, thereby completing the cycle of the refrigerant. Brine is circulated through the coil in the tank G by means of the brine-circulating pump H entering said pump through the piping $h$ and discharging into the coil G′ by way of the piping $h'$, and the said brine is cooled in the said tank by virtue of the expansion of the refrigerant therein, as just described. The cooling brine is led from the tank G through the piping $g^2$ and enters the main brine-header I′ to circulate through the freezing-plates, as follows: The brine passes through the valve $I^2$ and coupling K into the outer pipe M′ of each freezing-plate M and circulating around and about the inner horizontal pipe $M^2$ in the first section 1 of said freezing-plate. Next the brine passes down the vertical tubes N to the bottom of the same and rises through the inner vertical tubes *n* and enters the inner horizontal pipe $M^2$ in the first section thereof, $1^a$. The brine next passes down the inner vertical tubes *n′* in the right hand end *o* section $1^a$, then passes up around the outside of the tubes *n′* in the tubes N′, enters the left hand of section 2, goes to the right hand end of section 2, and passes down the vertical tubes $N^2$, after which it rises in the tubes $n^2$ into the left hand section of $2^a$, &c., until finally it leaves the main horizontal pipe M′ by way of the coupling at the end thereof. By virtue of this circulation of the cooled brine in the tubes composing the freezing-plates submerged in the water-tank C ice is evenly formed on the vertical tubes N, N′, &c. The brine after having performed its work in freezing the water is discharged into the trough Q and drains into the brine-storage tank I, from which it is drawn by the suction-piping *h* of the brine-pump H, as already mentioned.

When ice has been frozen to the required thickness on the plates M, they are disconnected from the main brine-header I′ by first closing the valves $I^2$ and then disconnecting the members of the coupling K by unscrewing the spindle $L^3$ and pulling the same to an inclined or horizontal position with the U-shaped strap $K^5$, when the valve chamber L can be separated from the chamber K′. A small portion of brine remains at all times in the cup $K^3$, which prevents the freezing together of the members of the coupling K. Next the elbow $m^3$ at the other end of the horizontal pipe M′ is turned up to prevent the brine contained in the freezing-plate from being spilled out of the same. Each freezing-plate, with its ice cake frozen thereto, and free from the tank is raised out of the tank C by means of the cranes $A^2$ and carried over the ice saws W and cut into sections by being lowered against the rails $C^3$ to allow the saws to cut the ice from the bottom to the top thereof. The freezing-plates, with the ice still adhering thereto, are again raised by the crane $A^2$ and brought over the openings B′ in the ice-house B and lowered into the same, the said ice-house being maintained at a low freezing temperature by means of cooling coils $B^3$. During transportation the tubes remain in the ice cake and serve to reinforce it and thus prevent accidental breakage. The next operation is to thaw the vertical tubes N N′ $N^2$, etc., of the freezing plates M from the cakes of ice, and which is accomplished by coupling the hose $R^3$ of the thawing apparatus with the end of the pipe M′ having the valve chamber L and connecting the hose $R^5$ with the end of the pipe having member of the coupling $m^4$. The pump is started and brine is drawn from the brine-thawing-off tank R and circulated through a freezing plate, the brine returning to the said tank R. By reason of the brine in the tank R having been warmed the tubes of the freezing plates are loosened from the ice surrounding them, and the said plate is next lifted out of the ice-house by means of one of the cranes $A^2$ and taken back to be coupled in position in the tank C, where it is again put into commission. The brine in the tank R is kept warm by means of the exhaust of the pump S, passing through the coil $S^2$ in said tank. The overflow of the brine in the tank R is led into the tank I by means of the piping *r*. The cakes of ice as the tubes of the freezing-plates are separated from the same have small vertical holes in them, which are now filled with distilled water by means of the hose X, supplied from the distilled-water storage-tank X′, and the low temperature of the cakes of ice and low temperature in the ice-house very quickly freezes the said water and produces solid cakes of ice. To produce clear ice on the freezing plates, air is forced through the piping T′ from the air-compressor T and enters the tank C under the freezing-plates at the nozzles *t* in the piping T′. The tank C can be cleaned and drained through the outlets $C^6$.

In the drawings the steam exhaust from the compressor engine enters the heater $D^3$ through the pipe $D^2$. The exhaust from the engine V for driving the auxiliary machinery also enters the said heater and from which it is directed to the condensing apparatus $D^4$ and then is discharged into the hot-well $D^6$. The main shaft Z is driven by the engine V, and it in turn drives the air-compressor, brine-circulating pump, and saws, as shown. The saw shaft W′ can be started and stopped by using the clutch Y, with handle $Y^2$, connected up therewith. The solid rods $m^6$, extending from horizontal pipes M′ and which are frozen into the ice, are not thawed loose, and the ice immediately adjacent thereto is returned to the tank C. The object of this is to be able to square the ends of the ice cakes when sawed, and the portions of ice returned to the tank will assist in cooling and freezing the next cake to be frozen.

I claim:

1. In an apparatus for making ice, a tank for containing water to be frozen, a support, a plurality of separate parallel tubes each connected at one end to said support and each closed at its outer end and means for circulating a freezing medium through said tubes: the said tubes being disposed in said tank with their outer closed ends and peripheries entirely free from the inner surfaces of said tank: whereby a single adherent cake of ice may be formed between said tubes and around their immersed peripheries and closed ends and free at its bounding surfaces from said tank surfaces.

2. In an apparatus for making plate ice the combination of a tank for containing water to be frozen, a support, a plurality of separate parallel tubes each connected at one end to said support and depending therefrom, and each closed at its outer end, means for raising said support and tubes out of said tank and means for circulating a freezing medium through said tubes: the said tubes being disposed in said tank with their outer closed ends and peripheries entirely free from the inner surfaces of said tank: whereby a single adherent cake of ice may be formed between said tubes and around their immersed peripheries and closed ends and free at its bounding surfaces from said tank surfaces and whereby thereafter said tubes and said adherent ice plate may be simultaneously removed from said tank.

3. In an apparatus for making plate ice, the combination of a tank for containing water to be frozen, a support, a plurality of separate parallel tubes each connected at one end to said support and depending therefrom, and each closed at its outer end, means for raising said support and tubes out of said tank, means for circulating a freezing medium through said tubes and means for separating said tubes and the ice cake formed thereon: the said tubes being disposed in said tank with their outer closed ends and peripheries entirely free from the inner surfaces of said tank: whereby a single adherent cake of ice may be formed between said tubes and around their immersed peripheries and closed ends and free at its bounding surfaces from said tank surfaces and whereby thereafter said tubes and said adherent ice cake may be simultaneously removed from said tank and whereby said adherent ice cake may be released from said tubes.

4. In an apparatus for making plate ice, the combination of a tank, a freezing plate consisting of a series of separate depending tubes removably supported in said tank, the ends, sides and bottom of said freezing plate being entirely free from the sides, ends and bottom of the tank, means for circulating a freezing medium through the tubes of said plate, whereby an adherent cake of ice may be formed entirely around the sides, ends and bottom of said freezing plate and free from the tank, means for removing said freezing plate and attached plate of ice from the tank and means detachably connected to said freezing plate for supplying a thawing medium thereto for separating said ice cake and said tubes.

5. The combination in an apparatus for making plate ice of a tank, a plurality of separate and independent freezing plates, each of which plates consists of a series of separate depending tubes and adapted to be supported free from the side and end walls and bottom of the tank and means for circulating a freezing medium through the tubes of said plates: whereby may be formed on each freezing plate a separate cake of ice surrounding the sides, ends and bottom of the said tubes and attached thereto and free from the tank, and from the next adjacent ice cake.

6. In an apparatus for making plate ice, the combination of a tank, a plurality of separate and independent freezing plates each of which plates consists of a series of separate depending tubes and adapted to be supported free from the side and end walls and bottom of the tank, means for circulating a freezing medium through the tubes of said plates, whereby may be formed on each freezing plate a separate cake of ice surrounding the sides, ends and bottom of the freezing plate and attached thereto and free from the tank, and from the next adjacent ice cake, and means for independently raising from the tank each freezing plate with ice cake attached thereto.

7. In an apparatus for making plate ice, the combination of a tank, a plurality of separate and independent freezing plates, each of which plates consists of a series of separate depending tubes removably supported in said tank, the ends, sides and bottom of said freezing plates being entirely free from the sides, ends and bottom of the tank, means for independently circulating and cutting off a freezing medium through each of the said freezing plates, whereby an independent cake of ice may be formed on each of said freezing plates, free from the tank and from the adjacent cakes, and means adapted to be independently connected to each of the said freezing plates for supplying a thawing medium thereto for releasing the adherent ice cake.

8. In an apparatus for making plate ice, the combination of a tank, a plurality of separate and independent freezing plates, each of which plates consists of a series of separate depending tubes removably supported in said tank, the ends, sides and bottom of said freezing plate being entirely free from the ends, sides and bottom of the tank, means for independently circulating and cutting off a freezing medium through each of the said freezing plates, whereby an independent cake of ice may be formed on each of said freezing plates free from the tank and from the adjacent cakes, means for independently removing each of the freezing plates with its attached cake of ice from the tank, and means adapted to be independently connected to each of the said freezing plates for supplying a thawing medium thereto for releasing the adherent cake.

9. In an apparatus for making plate ice, a tank, a hollow support, a plurality of parallel tubes in said tank closed at their ends depending from and communicating with said support, means for raising said support and removing said tubes from said tank, and an inlet duct and an outlet duct detachably connected to said support; and the said inlet duct communicating with a source of refrigerating medium.

10. In a freezing-plate, the combination of a main pipe, a second pipe within the same, collars between the said pipes, fitting the inner surface of the main pipe and the outer surface of the second pipe, dividing the main pipe in sections, plugs at the ends and at different points of the inner pipe dividing the latter into sections, tubes with their outer ends closed extending from the different sections of the main pipe, tubes open at both ends extending from the different sections of the second pipe, and leading into the tubes extending from the sections of the main pipe, and means to couple the ends of the freezing-plate with other appurtenances.

11. In an apparatus for making plate ice and in combination with an internally refrigerated freezing plate, means for dividing the ice cake while adherent to said plate into fractional parts, means for thawing a number of said parts from said plate and means for retaining the remainder of said parts connected to said plate.

12. In an ice making apparatus and in combination with a freezing plate comprising a header and a series of separate tubes depending therefrom, rods depending from said header and disposed respectively at each end of the series of tubes.

DAVID J. HAVENSTRITE.

Witnesses:

GERTRUDE T. PORTER,
ROBERT H. KIRK.